(12) United States Patent
Choi et al.

(10) Patent No.: US 11,923,523 B2
(45) Date of Patent: Mar. 5, 2024

(54) BATTERY MODULE

(71) Applicant: LG Chem, Ltd., Seoul (KR)

(72) Inventors: Jee-Soon Choi, Daejeon (KR); Jin-Hak Kong, Daejeon (KR); Yong-Seok Choi, Daejeon (KR)

(73) Assignee: LG Energy Solution, Ltd. (KR)

( * ) Notice: Subject to any disclaimer, the term of this patent is extended or adjusted under 35 U.S.C. 154(b) by 205 days.

(21) Appl. No.: 16/650,211

(22) PCT Filed: Feb. 19, 2019

(86) PCT No.: PCT/KR2019/001994
§ 371 (c)(1),
(2) Date: Mar. 24, 2020

(87) PCT Pub. No.: WO2019/194413
PCT Pub. Date: Oct. 10, 2019

(65) Prior Publication Data
US 2020/0266398 A1 Aug. 20, 2020

(30) Foreign Application Priority Data
Apr. 4, 2018 (KR) .................. 10-2018-0039232

(51) Int. Cl.
*H01M 10/617* (2014.01)
*H01M 10/48* (2006.01)
(Continued)

(52) U.S. Cl.
CPC ..... *H01M 10/6551* (2015.04); *H01M 10/482* (2013.01); *H01M 10/617* (2015.04);
(Continued)

(58) Field of Classification Search
CPC .. H01M 50/20; H01M 10/482; H01M 10/617; H01M 10/6551; H01M 50/529;
(Continued)

(56) References Cited

U.S. PATENT DOCUMENTS 6,255,015 B1 * 7/2001 Corrigan ............. H01M 10/625
429/163
7,041,408 B1 5/2006 Meyers
(Continued)

FOREIGN PATENT DOCUMENTS

CN 107636887 A 1/2018
CN 107799799 A 3/2018
(Continued)

OTHER PUBLICATIONS

Extended European Search Report including Written Opinion for Application No. EP19780914.8 dated Jan. 15, 2021.
(Continued)

*Primary Examiner* — Matthew T Martin
*Assistant Examiner* — Jessie Walls-Murray
(74) *Attorney, Agent, or Firm* — Lerner David LLP

(57) ABSTRACT

A battery module for improving heat balance of a cell assembly provided in the battery module includes a cell assembly having at least three battery cells stacked along a stacking axis such that at least one battery cell located at an interior position within the cell assembly along the stacking axis has a greater thickness along the stacking axis than a battery cell located at an outer side of the cell assembly. A module housing includes at least one sidewall and is configured to accommodate the cell assembly in an inner space defined by the sidewall.

9 Claims, 10 Drawing Sheets

(51) Int. Cl.
*H01M 10/6551* (2014.01)
*H01M 50/211* (2021.01)
*H01M 50/529* (2021.01)
*H01M 10/625* (2014.01)
*H01M 50/224* (2021.01)
*H01M 50/536* (2021.01)

(52) U.S. Cl.
CPC ........ *H01M 50/529* (2021.01); *H01M 10/625* (2015.04); *H01M 50/211* (2021.01); *H01M 50/224* (2021.01); *H01M 50/536* (2021.01)

(58) Field of Classification Search
CPC ............. H01M 50/531; H01M 10/625; H01M 2220/20; H01M 50/211; Y02E 60/10
See application file for complete search history.

(56) References Cited

U.S. PATENT DOCUMENTS

| | | | |
|---|---|---|---|
| 9,705,156 B2 | 7/2017 | Dorsch | |
| 2004/0119442 A1* | 6/2004 | Lee | H02J 7/0042 |
| | | | 320/112 |
| 2005/0069763 A1* | 3/2005 | Hong | H01M 50/562 |
| | | | 429/185 |
| 2012/0015223 A1 | 1/2012 | Bhardwaj et al. | |
| 2012/0015226 A1* | 1/2012 | Kim | H01M 50/24 |
| | | | 429/94 |
| 2012/0156543 A1 | 6/2012 | Cicero et al. | |
| 2013/0288100 A1* | 10/2013 | Dunkel | H01M 10/4207 |
| | | | 83/13 |
| 2013/0337310 A1 | 12/2013 | Omura et al. | |
| 2014/0072850 A1* | 3/2014 | Kwon | H01M 10/0585 |
| | | | 429/94 |
| 2014/0157584 A1 | 6/2014 | Park et al. | |
| 2015/0333375 A1* | 11/2015 | Kwon | H01M 10/0413 |
| | | | 429/185 |
| 2017/0012315 A1* | 1/2017 | Kayano | H01M 10/0481 |
| 2018/0062225 A1 | 3/2018 | You et al. | |
| 2018/0138472 A1 | 5/2018 | Choi | |
| 2018/0175343 A1 | 6/2018 | Choi et al. | |
| 2018/0175346 A1* | 6/2018 | Schmid-Schoenbein | |
| | | | H01M 50/121 |

FOREIGN PATENT DOCUMENTS

| | | | | |
|---|---|---|---|---|
| EP | 2797140 A1 | 10/2014 | | |
| JP | 2000164185 A | 6/2000 | | |
| JP | 2009182001 A | 8/2009 | | |
| JP | 2011044275 A | 3/2011 | | |
| JP | 4738730 B2 | 8/2011 | | |
| JP | 2013143185 A | 7/2013 | | |
| JP | 2013157112 A | 8/2013 | | |
| JP | WO2012117681 A1 | 7/2014 | | |
| KR | 980006597 A | 3/1998 | | |
| KR | 20140015301 A | 2/2014 | | |
| KR | 101431278 B1 | 8/2014 | | |
| KR | 20150046533 A | * | 4/2015 | ........ H01M 10/0413 |
| KR | 101635163 B1 | 6/2016 | | |
| KR | 20170034775 A | 3/2017 | | |
| KR | 20170072698 A | 6/2017 | | |
| WO | 2017209388 A1 | 12/2017 | | |

OTHER PUBLICATIONS

International Search Report for Application No. PCT/KR2019/001994, dated May 17, 2019, pp. 1-2.

Search Report dated Jan. 17, 2022 from Office Action for Chinese Application No. 201980006045.0 dated Jan. 29, 2022. 3 pgs.

* cited by examiner

BATTERY MODULE

CROSS-REFERENCE TO RELATED APPLICATIONS

The present application is a national phase entry under 35 U.S.C. § 371 of International Application No. PCT/KR2019/001994 filed Feb. 19, 2019, which claims priority from Korean Patent Application No. 10-2018-0039232 filed on Apr. 4, 2018, the disclosures of which are incorporated herein by reference.

TECHNICAL FIELD

The present disclosure relates to a battery module having a plurality of battery cells with various sizes and a battery pack including the battery module, and more particularly, to a battery module for improving heat balance of a cell assembly provided in the battery module.

BACKGROUND ART

Secondary batteries currently commercialized include nickel cadmium batteries, nickel hydrogen batteries, nickel zinc batteries, lithium secondary batteries and so on. Among them, the lithium secondary batteries are more prominent in comparison to nickel-based secondary batteries due to advantages such as free charging and discharging, caused by substantially no memory effect, very low self-discharge rate, and high energy density.

The secondary battery is easily applicable to various product groups and has electrical characteristics with high energy density. The secondary battery is applied not only to portable electronic devices but also to electric vehicles, hybrid electric vehicles or electric power storage devices, driven by electric driving sources.

The secondary battery is attracting attention as a new energy source for eco-friendliness and energy efficiency due to not only a primary advantage of remarkably reducing the use of fossil fuels but also no generation of by-products during energy use.

A battery pack applied to an electric vehicle or the like has a structure in which a plurality of battery modules, each having a plurality of battery cells, are connected to obtain a high output. In addition, each battery cell includes a positive electrode current collector, a negative electrode current collector, a separator, an active material and an electrolyte as an electrode assembly, and may be repeatedly charged and discharged by an electrochemical reaction between the components.

Meanwhile, as the need for a large-capacity structure has recently increased along with the need for utilization as an energy storage source, there has been an increasing demand for a battery module having a plurality of secondary batteries connected in series and/or in parallel.

Since the battery module is manufactured such that a plurality of secondary batteries are densely packed in a narrow space, it is important to easily release the heat generated from each battery cell to the outside.

In other words, during the secondary battery charging or discharging process, heat is generated due to the electrochemical reaction. Thus, if the heat of the battery module generated during the charging and discharging process is not effectively removed, heat accumulation may occur. In addition, deterioration of the battery module may be accelerated and, in some cases, ignition or explosion may occur.

Also, when a plurality of battery cells are mounted in one battery module, the density of the battery cells is very high due to space limitation. In addition, since the caloric value of the battery cell is proportional to the square of current, the temperature of the battery cell is likely to rise sharply during high-rate discharge. Particularly, the heat island phenomenon where heat is concentrated in an inner part (a central part) of a battery cell array mounted in the battery module is likely to occur.

If the heat island phenomenon occurs in the long term, the cell performance of battery cells located in the inner region is deteriorated, and the output voltages of the battery cells electrically connected in parallel become uneven, thereby causing so-called cell imbalance phenomenon. As a result, in the conventional art, it is difficult for the battery module to exhibit high performance for a long time in the high-rate discharge. Accordingly, a technology capable of improving heat balance is needed to improve the performance and life characteristics of the battery module.

DISCLOSURE

Technical Problem

The present disclosure is designed to solve the problems of the related art, and therefore the present disclosure is directed to providing a battery module, which may improve heat balance of a cell assembly.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly having at least three battery cells stacked in one direction, so that among the battery cells, at least one battery cell located at an inner side in the stacking direction of the battery cells has a greater thickness in the stacking direction than a battery cell located at an outer side; and a module housing having at least one sidewall and configured to accommodate the cell assembly in an inner space defined by the sidewall.

Also, the thickness of the battery cells in the stacking direction may be gradually increased from a battery cell located at an outermost side in the stacking direction to a battery cell located at an innermost side.

Moreover, in the battery cells, the at least one battery cell located at the inner side in the stacking direction may have a greater battery capacity than the battery cell located at the outer side.

In addition, the sidewall of the module housing may be configured to compress the battery cells inwards in the stacking direction so that no gap is generated between the battery cells.

Further, contact surfaces of the battery cells may be bonded to each other so that no gap is generated between the battery cells.

Also, exterior cases of the battery cells may be integrated and connected to each other.

Moreover, an electrode lead of the at least one battery cell located at the inner side in the stacking direction of the battery cells may have a greater outer area than an electrode lead of the battery cell located at the outer side.

In addition, an electrode lead of the at least one battery cell located at the inner side in the stacking direction of the battery cells may have a greater thickness in the stacking direction of the battery cells than an electrode lead of the battery cell located at the outer side.

Further, in another aspect of the present disclosure, there is also provided a battery pack, which includes at least one battery module as above.

In addition, in another aspect of the present disclosure, there is also provided a vehicle, which includes the battery pack.

Advantageous Effects

According to one embodiment of the present disclosure, since a battery cell located at an inner side in the stacking direction of the battery cells is formed to have a greater thickness in the stacking direction than a battery cell located at an outer side, it is possible to reduce the frequency that a boundary surface is formed between the battery cells inside the cell assembly.

Thus, since excessive heat accumulation in the battery cells located at the center of the cell assembly may be prevented, the heat balance of the entire battery cells may be properly maintained, and the performance and life characteristics of the battery module may be effectively enhanced.

In addition, according to another embodiment of the present disclosure, since the vertical height of the battery cell located at an inner side of the cell assembly is relatively higher than that of the other battery cells, the outer surface area of the battery cells located in the cell assembly may be effectively increased. In particular, since the area of the outer surface exposed to the outside, rather than the bonded surface between the battery cells, may be increased, the heat dissipation amount may be increased compared to the battery cells located at a relatively outer side in the stacking direction. Accordingly, the heat balance of the cell assembly may be improved.

Moreover, according to another embodiment of the present disclosure, as the elastic member is provided inside the module housing, the elastic member may flexibly compress the cell assembly, which reduces the gap between the battery cells, thereby greatly decreasing heat resistance. Accordingly, the heat dissipation characteristic of the cell assembly may be improved, and it is possible to improve the heat balance according to the cell thickness and exhibit synergistic effects.

In addition, according to another embodiment of the present disclosure, since the adhesive layer is formed between the battery cells, a gap is not generated between the battery cells, thereby greatly reducing the heat resistance of the boundary surface. Moreover, since the battery cells are restrained to each other, the stacking arrangement is not disturbed, and the battery cells may be prevented from moving due to external impact, thereby improving the stability or durability of the cell assembly.

Further, according to another embodiment of the present disclosure, in the cell assembly having an exterior case integrated formed, since a gap is not generated between battery cells, it is possible to minimize the heat resistance generated on the boundary surface. In addition, the size of the exterior case of the cell assembly may be reduced.

Also, according to another embodiment of the present disclosure, since the outer surface of the electrode lead of the battery cell located inside the cell assembly is formed relatively wide, it is possible to effectively increase the heat dissipation amount of the battery cells located inside, and the heat dissipation effect and the synergy effect may be provided to the battery cells formed at the inner side and formed thickly.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
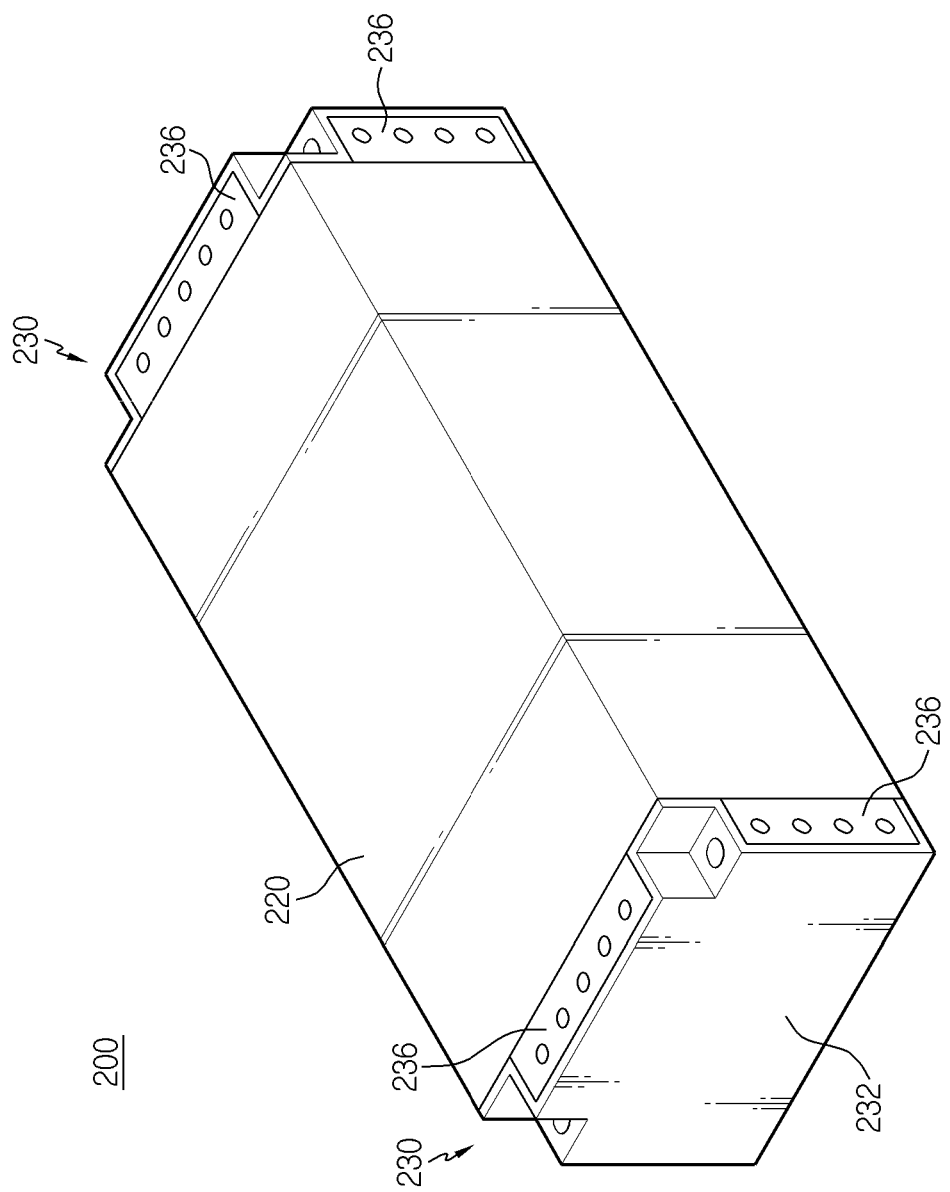
FIG. 1 is a perspective view schematically showing a battery module according to an embodiment of the present disclosure.
Figure 2:
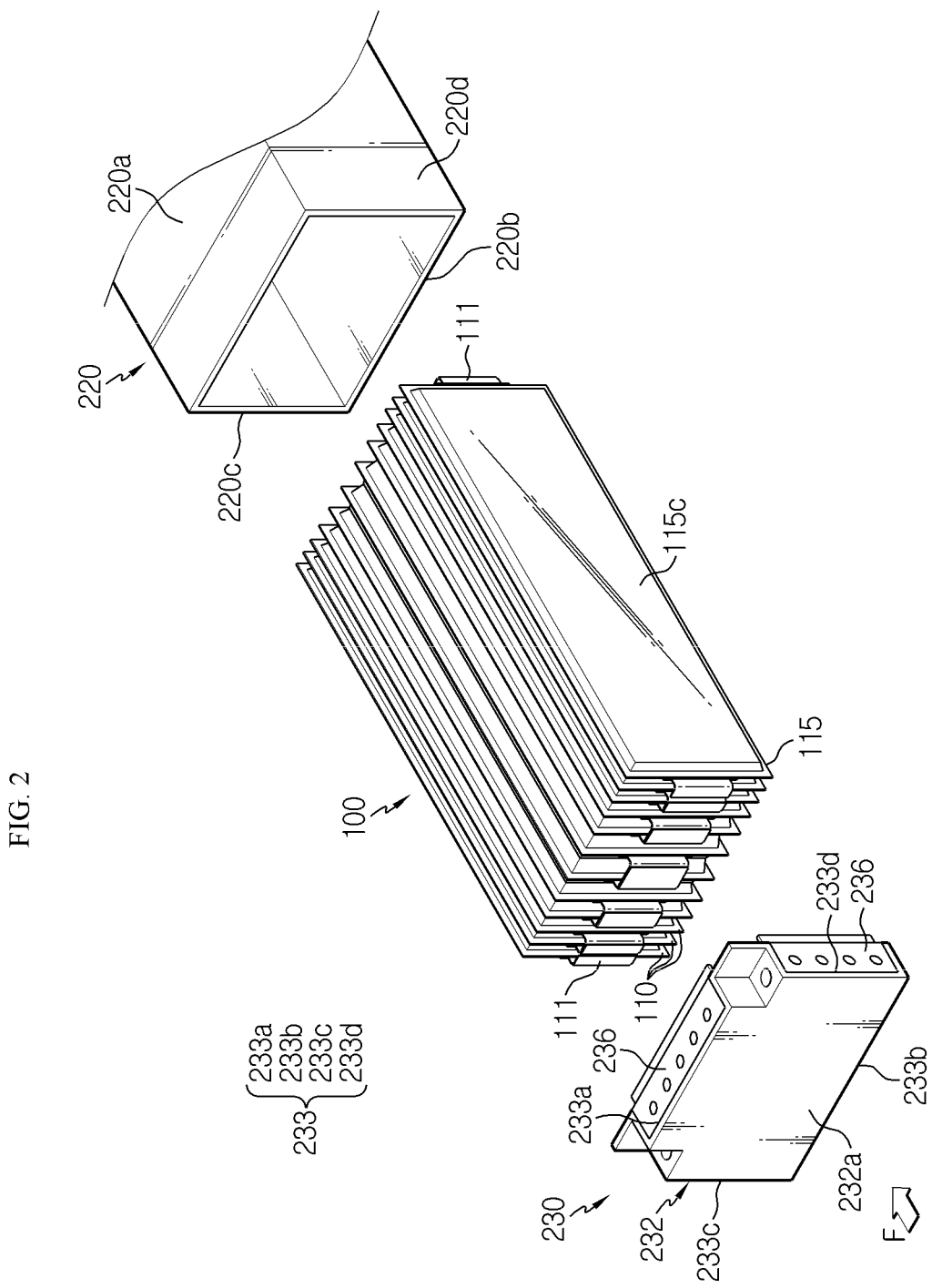
FIG. 2 is an exploded perspective view schematically showing components of the battery module according to an embodiment of the present disclosure.

FIG. 1 is a perspective view schematically showing a battery module according to an embodiment of the present disclosure. FIG. 2 is an exploded perspective view schematically showing components of the battery module according to an embodiment of the present disclosure. Also, FIG. 3 is a front view schematically showing some components of the battery module according to an embodiment of the present disclosure.

Figure 3:
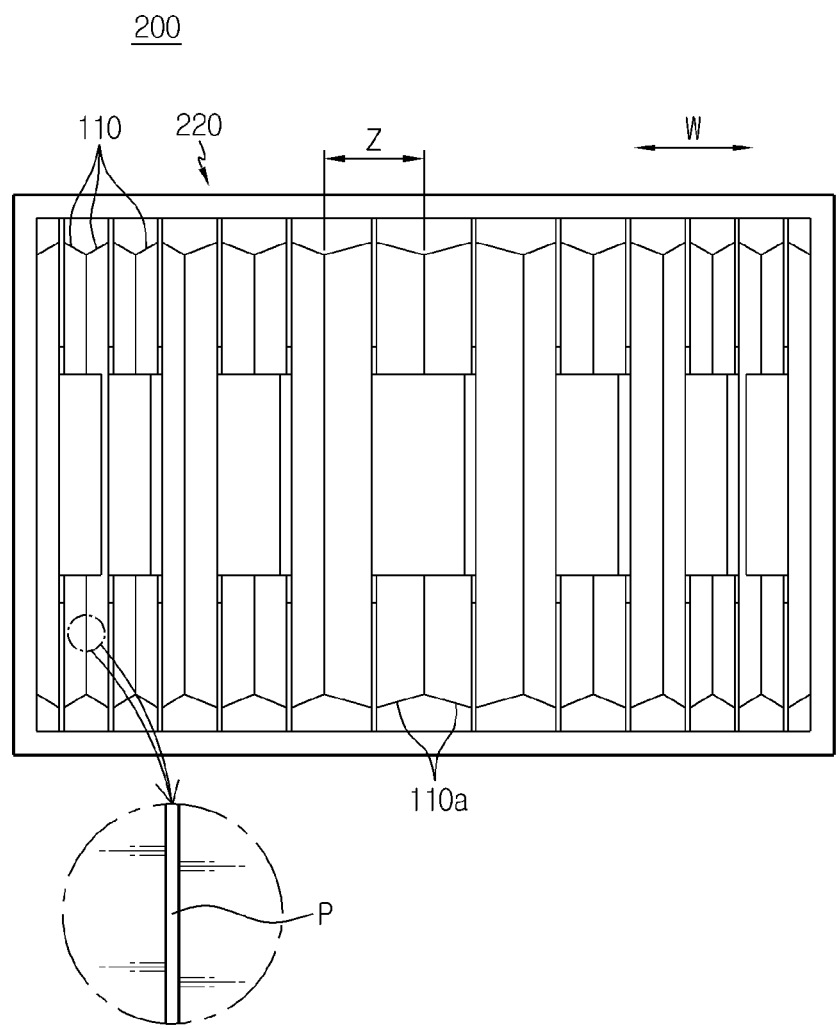
FIG. 3 is a front view schematically showing some components of the battery module according to an embodiment of the present disclosure.

Referring to FIGS. 1 to 3, a battery module 200 according to an embodiment of the present disclosure includes a cell assembly 100, a module housing 220 and an end frame 230.

Here, the cell assembly 100 may include at least three battery cells 110. Also, the battery cell 110 may be a pouch-type battery cell 110. In particular, the pouch-type battery cell 110 may include an electrode assembly, an electrolyte and a pouch exterior case 115.

Here, the electrode assembly may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Also, the pouch exterior case 115 may be configured to have an outer insulating layer, a metal layer and an inner adhesive layer. The pouch exterior case 115 may be configured to include a metal thin film, for example an aluminum thin film, in order to protect inner components such as the electrode assembly and the electrolyte, to enhance electrochemical properties by the electrode assembly and the electrolyte, and to improve heat dissipation. In addition, the aluminum thin film may be interposed between insulating layers made of an insulating material so as to secure electrical insulation with components inside the battery cell 110 such as the electrode assembly and the electrolyte or with other components outside the battery cell 110.

In particular, the pouch exterior case 115 may be composed of two pouches, at least one of which may have a concave inner space formed therein. In addition, the electrode assembly may be accommodated in the inner space of the pouch. Also, sealing portions are provided at outer circumferential surfaces of two pouches, and the sealing portions are fused to each other to seal the inner space in which the electrode assembly is accommodated. Namely, the exterior case 115 may have an accommodation portion 115c in which the electrode assembly and the electrolyte are accommodated.

Each pouch-type battery cell 110 may include an electrode lead 111, and the electrode lead 111 may include a positive electrode lead and a negative electrode lead.

In more detail, the electrode lead 111 may be configured to protrude forward or rearward from the sealing portion located at the outer circumference of the front or rear side of the pouch exterior case 115. In addition, the electrode lead 111 may serve as an electrode terminal of the battery cell 110. For example, as shown in FIG. 2, one electrode lead 111 may be configured to protrude forward from the battery cell 110, and the other electrode lead 111 may configured to protrude rearward from the battery cell 110.

Thus, according to this configuration of the present disclosure, in one battery cell 110, there is no interference between the positive electrode lead and the negative electrode lead, thereby widening the area of the electrode lead 111. In addition, a welding process between the plurality of electrode leads 111 or between the electrode lead 111 and a bus bar (not shown) may be performed more easily.

In addition, a plurality of pouch-type battery cells 110 may be included in the battery module 200 and arranged to be stacked in at least one direction. For example, as shown in FIG. 2, a plurality of pouch-type battery cells 110 may be stacked in a right and left direction. At this time, each pouch-type battery cells 110 may be disposed to stand approximately perpendicular to the ground, when being observed in the F direction, such that two broad surfaces are located at right and left sides, respectively, and the sealing portions are located at upper, lower, front and rear sides. In other words, each battery cell 110 may be configured to stand in an upper and lower direction.

Meanwhile, the terms indicating directions such as front, rear, left, right, upper and lower directions used herein may be changed depending on the position of an observer or the shape of an object. For the sake of convenience of description, in the present specification, directions are classified into front, rear, left, right, upper and lower directions, based on the F direction.

Further, among the battery cells 110, at least one battery cell 110 located at an inner side in the stacking direction W of the battery cells 110 may have a greater thickness Z in the stacking direction (the lateral direction) than a battery cell 110 located at an outer side. Here, the thickness Z means a thickness Z in the lateral direction of the accommodation portion 115c (FIG. 2) of the battery cell 110 in which the electrode assembly and the electrolyte of the battery cell 110 are accommodated.

Specifically, among the battery cells 110, a battery cell 110 adjacent to an innermost side may have a greater thickness Z in the lateral direction than a battery cell 110 located at an outer side. In addition, among the battery cells 110, the battery cell 110 located at the innermost side may have the greatest thickness Z in the lateral direction.

Further, the thickness Z of the battery cells 110 in the stacking direction W of the battery cells 110 may be gradually increased from the battery cell 110 located at the outermost side to the battery cell 110 located at the innermost side.

For example, as shown in FIG. 3, the cell assembly 100 includes 12 battery cells 110. Among the twelve battery cells 110, two battery cells 110a located at the innermost side are formed to have a greater thickness Z in the lateral direction than the other battery cells 110.

Meanwhile, in the battery module 200 having the plurality of battery cells 110, a gap is generated at a boundary surface P between the battery cells 110, and thus heat resistance may be generated on the boundary surface P.

Thus, according to this configuration of the present disclosure, as the battery module 200 of the present disclosure has a structure in which a battery cell 110 located at an inner side in the stacking direction of the battery cells 110 is formed to have a greater thickness Z in the stacking direction than a battery cell 110 located at an outer side, it is possible to reduce the frequency that the boundary surface P is formed between the battery cells 110 inside the cell assembly 100. That is, the boundary surface P is formed less between the battery cells 110 from the outer side of the cell assembly 100 toward the inner side of the cell assembly 100.

Accordingly, it is possible to prevent heat from be excessively accumulated in the battery cells 110 located at the center of the cell assembly 100, thereby properly maintaining the heat balance of the entire battery cells 110 and effectively improving the performance and life characteristics of the battery module 200.

Further, in the case of the cell assembly 100 having a plurality of the battery cells 110 of various thickness Z, when the design capacity of the battery module 200 is changed, it is possible to perform the design change easily by adding required battery cells 110 or removing unnecessary battery cells 110, as compared with a cell assembly 100 having one large battery cell 110.

In addition, in the case of the cell assembly 100 having a plurality of battery cells 110 of various thickness Z, since it is possible to exchange only a battery cell 110 having a failure with a new battery cell 110 among the plurality of battery cells 110, the maintenance is convenient and the maintenance cost may be reduced.

Referring to FIGS. 2 and 3 again, among the plurality of battery cells 110, at least one battery cell 110 located at the inner side in the stacking direction may have a larger battery capacity than the battery cell 110 located at the outer side. In other words, at least one battery cell 110 located at the inner side may include the exterior case 115 of a larger capacity capable of accommodating the electrode assembly and electrolyte than the battery cell 110 located at the outer side. In other words, the battery cell 110 located at the inner side may accommodate greater electrode assembly and more electrolyte in the exterior case 115 than the battery cell 110 adjacent to the outer side.

Accordingly, the energy capacity per volume of the cell assembly 100 may be similar at both the inner region and the outer region of the cell assembly 100.

The configuration of the pouch-type battery cell 110 described above is obvious to those skilled in the art and thus will not be described in detail here. In addition, the cell assembly 100 according to the present disclosure may employ various kinds of battery cells (secondary batteries) known at the time of filing of this application.

Referring to FIGS. 1 and 2 again, the module housing 220 may protect the internal structure of the battery module 200 from an external impact or prevent foreign substances from entering the battery module 200. Accordingly, the module housing 220 provides structural stability to the battery module 200 and protects the components accommodated therein, such as the cell assembly 100, from other external physical factors such as impacts and substances. To this end, the module housing 220 may be made of a metal such as steel or aluminum.

In particular, when the module housing 220 is made of a metal material including aluminum, the heat generated in the cell assembly 100 may be effectively discharged out of the module housing 220 by means of the high thermal conductivity of aluminum.

In addition, the module housing 220 may include at least one sidewall 220a, 220b, 220c, 220d.

Specifically, if a plurality of sidewalls 220a, 220b, 220c, 220d are provided, the sidewalls 220a, 220b, 220c, 220d may be connected to each other. For example, when viewed in the direction F, the sidewalls 220a, 220b, 220c, 220d may include an upper wall 220a, a lower wall 220b, a left sidewall 220c and a right sidewall 220d based on the cell assembly 100, and the walls 220a, 220b, 220c, 220d may be connected to each other.

In addition, the module housing 220 may have an inner space defined by the sidewalls 220a, 220b, 220c, 220d to accommodate the cell assembly 100 therein. Specifically, the inner space may have an internal structure corresponding to the outer shape of the cell assembly 100.

For example, as shown in FIG. 2, the upper wall 220a and the lower wall 220b of the module housing 220 may be perpendicularly connected to the left sidewall 220c and the right sidewall 220d so that the module housing 220 may accommodate the cell assembly 100 having a substantially rectangular parallelepiped shape.

Further, the inner space may be provided such that at least one of the upper wall 220a, the lower wall 220b, the left sidewall 220c and the right sidewall 220d of the module housing 220 contacts at least one side surface of the cell assembly 100. That is, as the area where the walls 220a, 220b, 220c, 220d of the module housing 220 directly contact the outer surfaces of the cell assembly 100 is greater, the heat generated in the cell assembly 100 may be effectively conducted to the module housing 220.

For example, as shown in FIG. 2, in the module housing 220, the upper wall 220a, the lower wall 220b, the left side wall 220c and the right side wall 220d may be formed to contact an upper surface, a lower side, a left side surface and a right side surface of the cell assembly 100.

More specifically, the module housing 220 may be configured using a mono frame in which the upper wall 220a, the lower wall 220b, the left sidewall 220c and the right sidewall 220d are provided in an integrated form.

Here, the integrated form means one body formed by a casting method or the like. Specifically, in the module housing 220, both ends of the upper wall 220a, the lower wall 220b, the left sidewall 220c and the right sidewall 220d may be connected to each other.

For example, as shown in FIG. 2, the module housing 220 may have a rectangular tubular shape that is opened in a front and rear direction, where both ends of the upper wall 220a, the lower wall 220b, the left side wall 220c and the right side wall 220d are connected to each other.

Thus, according to this configuration of the present disclosure, the module housing 220 is formed to surround the side surfaces of the cell assembly 100, thereby effectively dissipating the heat generated in the cell assembly 100 when the battery module 200 is charged or discharged.

Referring to FIGS. 1 and 2 again, the end frame 230 may include a body frame 232 and a bonding plate 236.

Here, the body frame 232 may include a main wall 232a. That is, the main wall 232a may have a plate shape upright in the vertical direction. Also, the main wall 232a may have a module terminal (not shown) to establish an electrical connection between the cell assembly 100 and an external device.

In addition, the body frame 232 may have at least one sidewall 233 extending from an outer periphery of the main wall 232a toward the module housing 220.

Specifically, when viewed in the direction F, the body frame 232 may include an upper sidewall 233a, a lower sidewall 233b, a left sidewall 233c and a right sidewall 233d based on the center of the main wall 232a. Further, the sidewalls 233a, 233b, 233c, 233d may be connected to each other.

Moreover, the body frame 232 may protect the battery module 200 from external impacts. Accordingly, the body frame 232 gives structural stability to the battery module 200 and protects components accommodated therein, such as the cell assembly 100, from other external physical factors such as impacts and substances. To this end, the body frame 232 may be made of a metal material such as steel or aluminum.

Further, one side portion of the bonding plate 236 may be fixed to the sidewall 233 of the body frame 232. That is, the bonding plate 236 may be divided into a front portion and a rear portion based on a lateral line of a predetermined position on the bonding plate 236, and the front portion or the rear portion of the bonding plate 236 may be coupled and fixed to an outer surface of the sidewall 233 of the body frame 232.

In addition, the bonding plate 236 may be configured such that the rear portion is coupled to the front end of the module housing 220 when the front portion of the bonding plate 236 is coupled and fixed to the outer surface of the sidewall 233 of the body frame 232. Conversely, when the rear portion of the bonding plate 236 is coupled and fixed to the outer surface of the sidewall 233 of the body frame 232, the front portion may be coupled to the rear end of the module housing 220.

Further, the bonding plate 236 may be made of a metal material such as steel or aluminum.

Figure 4:
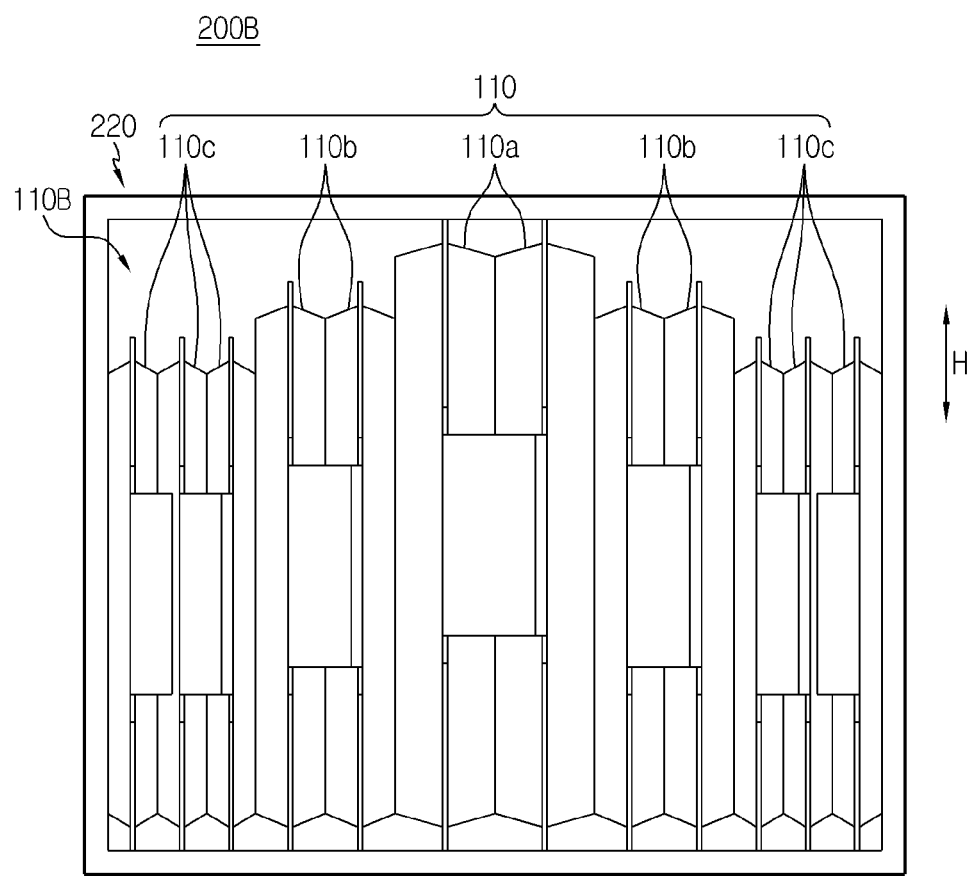
FIG. 4 is a front view schematically showing some components of a battery module according to another embodiment of the present disclosure.

FIG. 4 is a front view schematically showing some components of a battery module according to another embodiment of the present disclosure.

Referring to FIG. 4, a battery module 200B according to another embodiment of the present invention may be configured such that among the at least three battery cells 110 provided in the cell assembly 100B, the height in the vertical direction H of a battery cell 110 located at the inner side is greater than the height of the battery cell 110 located at the outer side.

For example, as shown in FIG. 4, among twelve battery cells 110, two battery cells 110a located at the innermost side may be formed to have the greatest height in the vertical direction H, four battery cell 110b adjacent to the battery cells 110a may be formed to have a second height, and six battery cells 110c positioned at the outer side may be formed to have the lowest height in the vertical direction H.

Thus, according to this configuration of the present disclosure, in the battery module 200B according to another embodiment, since the height in the vertical direction H of the battery cell 110 located at the inside of the cell assembly 100B is relatively higher than that of the remaining battery cells 110, it is possible to effectively increase the outer area of the battery cell 110 located at the inner side, and it is possible to increase the area of the outer surface exposed to the outside rather than the bonded surface between the battery cells 110, thereby increasing the heat dissipation amount compared to the battery cells 110 located at the relatively outer side in the stacking direction.

Accordingly, it is possible to prevent heat from being excessively accumulated in the battery cells 110 positioned at the center of the cell assembly 100B, thereby suitably maintaining the heat balance of all battery cells 110 and effectively enhancing the performance and life characteristics of the battery module 200B.

Figure 5:
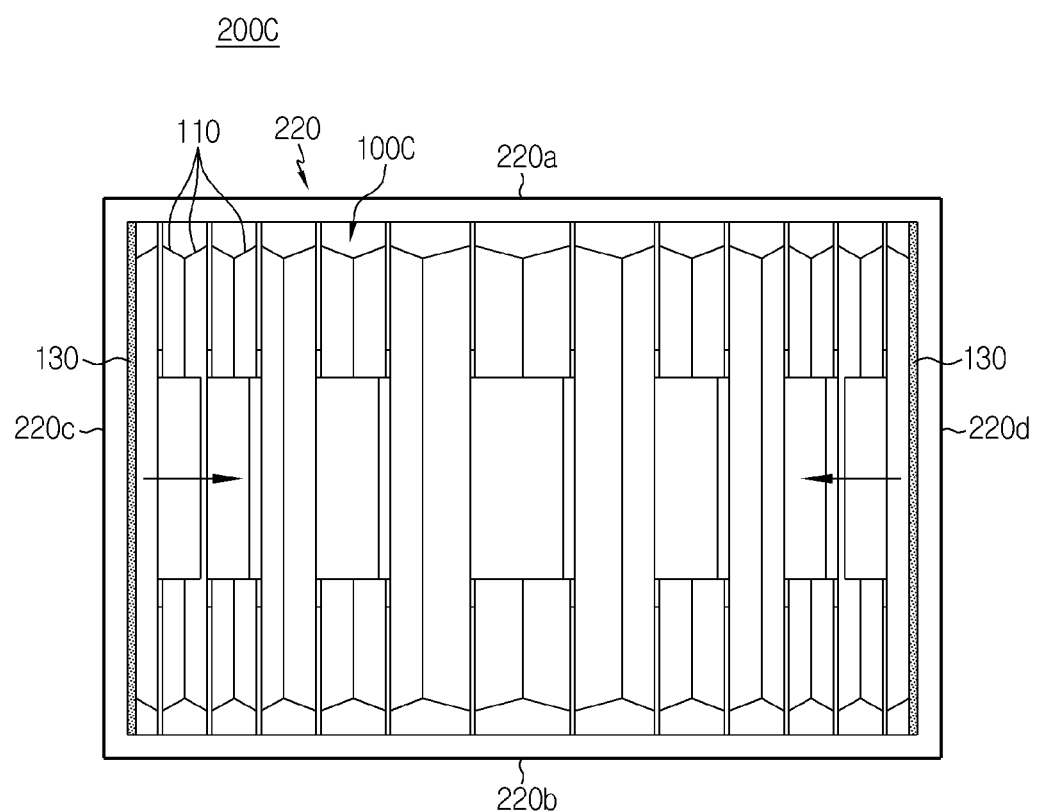
FIG. 5 is a front view schematically showing some components of a battery module according to still another embodiment of the present disclosure.

FIG. 5 is a front view schematically showing some components of a battery module according to still another embodiment of the present disclosure.

Referring to FIG. 5, the sidewalls 220a, 220b, 220c, 220d of the module housing 220 may be configured to compress the battery cells 110 inwards in the stacking direction to prevent a gap from being generated between the battery cells 110. At this time, the battery module 200C of FIG. 5 may further include an elastic member 130 in the inner space accommodating the cell assembly 100C of the module housing 220, as compared with the battery module 200 of FIG. 3.

Specifically, the elastic member 130 may have an elastic material that is excellent in heat dissipation property and has a volume easily increasing and decreasing depending on an external pressure. For example, the elastic member 130 may be a silicon pad. In addition, the elastic member 130 may be respectively positioned at both side ends of the plurality of battery cells 110 in the stacking direction. For example, as shown in FIG. 5, two elastic members 130 may be respectively positioned on the inner surfaces of the left sidewall 220c and the right sidewall 220d located at both sides of the battery cell 110 in the lateral direction.

Thus, according to this configuration of the present disclosure, since the elastic member 130 is provided inside the module housing 220, the elastic member 130 may elastically compress the cell assembly 100C, thereby reducing the gap between the battery cells 110 and thus greatly reducing the heat resistance at the boundary surface.

Figure 6:
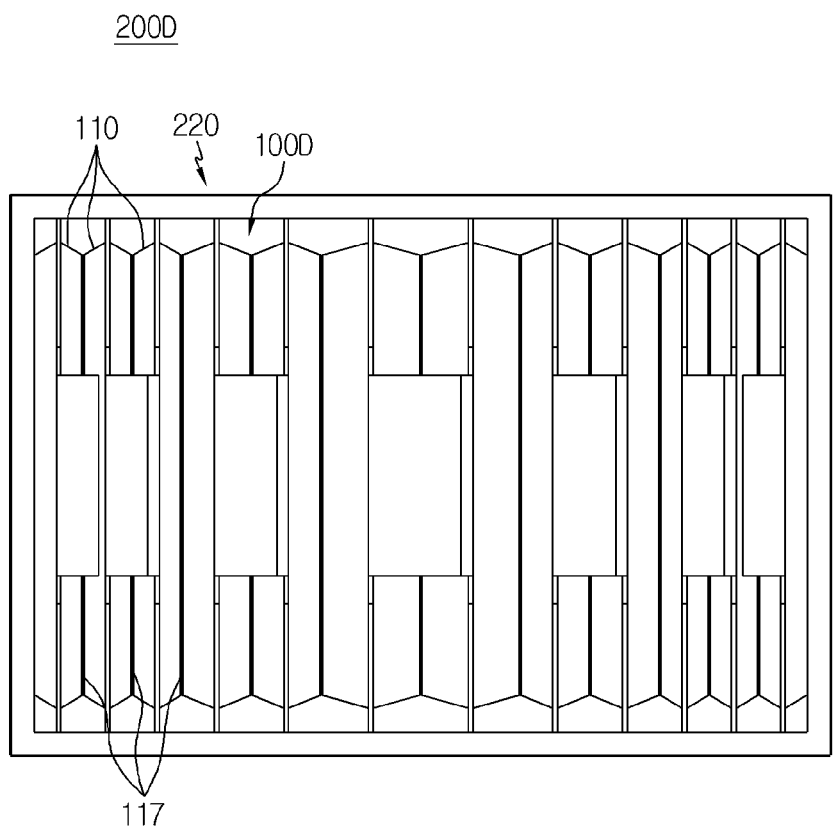
FIG. 6 is a front view schematically showing some components of a battery module according to still another embodiment of the present disclosure.

FIG. 6 is a front view schematically showing some components of a battery module according to still another embodiment of the present disclosure.

Referring to FIG. 6, in the cell assembly 100D of the battery module 200D according to still another embodiment, the outer surfaces of the battery cells 110 may be bonded to each other, compared to the cell assembly 100 of FIG. 3. Specifically, an adhesive layer 117 may be formed between the plurality of battery cells 110 of the cell assembly 100D to prevent a gap from being generated between the battery cells 110.

Further, the adhesive layer 117 is preferably made of a material having excellent heat dissipation, and may be, for example, a hardening grease or a glue. However, the adhesive layer 117 is not limited to the adhesive material, and the adhesive layer 117 may be made using a known heat-dissipative adhesive material.

Thus, according to this configuration of the present disclosure, since the adhesive layer 117 is formed between the battery cells 110 not to generate a gap between the battery cells 110, the heat resistance of the boundary surface between the battery cells 110 may be greatly reduced, and the battery cells 110 are restrained to each other so that their stacking arrangement is not disturbed while preventing the battery cell 110 from moving due to an external impact, thereby improving the stability and durability of the cell assembly 100D.

Figure 7:
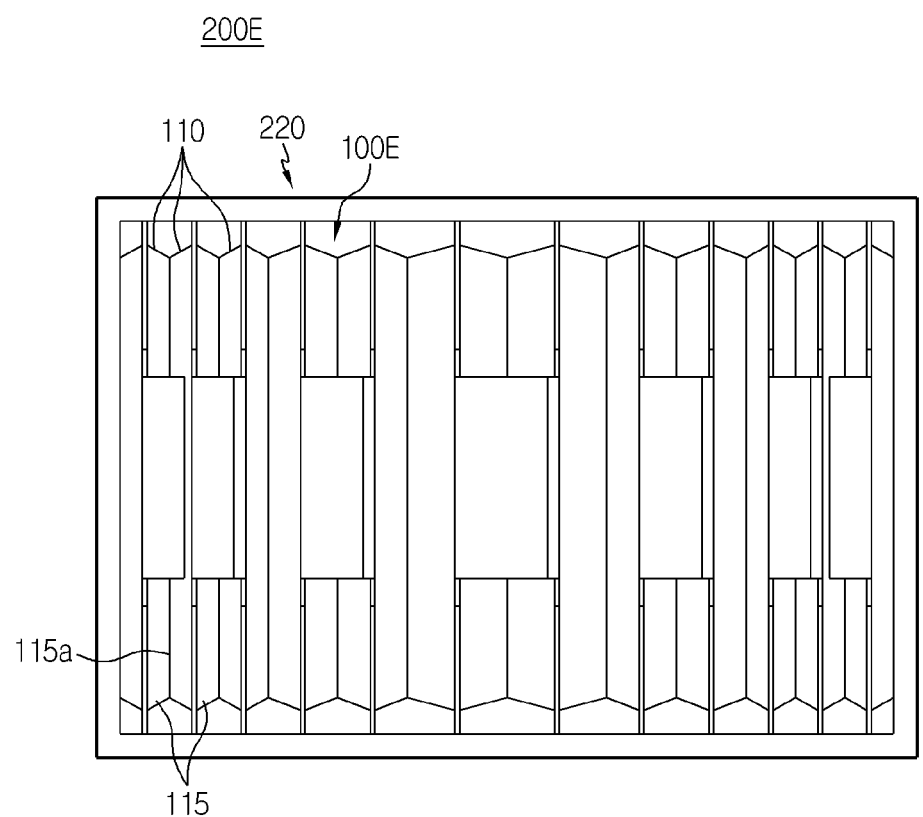
FIG. 7 is a front view schematically showing some components of a battery module according to still another embodiment of the present disclosure.

FIG. 7 is a front view schematically showing some components of a battery module according to still another embodiment of the present disclosure.

In the cell assembly 100E of the battery module 200E of FIG. 7, the exterior cases 115 of the battery cells 110 may be integrated and connected to each other, compared with the cell assembly 100 of FIG. 3. In addition, the exterior cases 115 of the battery cells 110 may be shaped such that their portions 115a contacting each other are connected to each other. That is, the exterior cases 115 of the at least three battery cells 110 provided in the cell assembly 100E may be formed as an integrated exterior case 115 having a plurality of accommodation portions capable of accommodating an electrode assembly and an electrolyte.

For example, as shown in FIG. 7, the exterior cases 115 of twelve battery cells 110 may be integrally formed. That is, the twelve battery cells 110 may be formed to have an integrated exterior case 115.

Accordingly, according to this configuration of the present disclosure, in the cell assembly 100E having the outer case 115 integrally formed, it is possible to minimize the heat resistance generated on the boundary surface because there is no gap between the battery cells 110. In addition, the size of the exterior case 115 of the cell assembly 100E may be effectively reduced.

Figure 8:
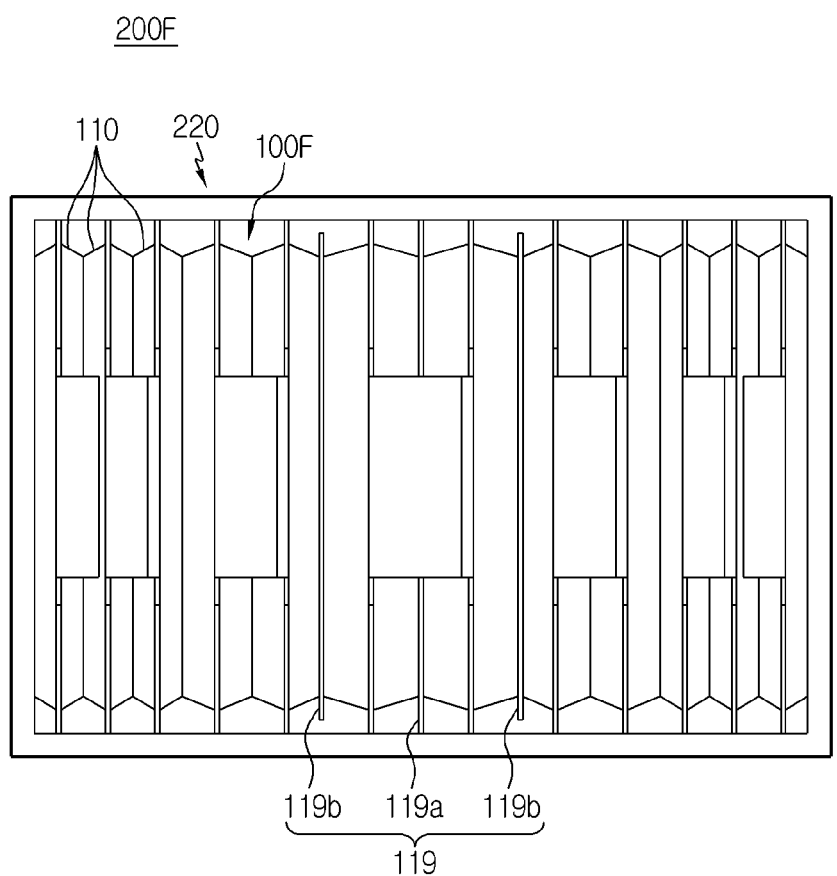
FIG. 8 is a front view schematically showing some components of a battery module according to still another embodiment of the present disclosure.

FIG. 8 is a front view schematically showing some components of a battery module according to still another embodiment of the present disclosure.

Referring to FIG. 8, the cell assembly 100F of the battery module 200F according to still another embodiment as shown in FIG. 8 may further include a cooling fin 119.

Specifically, the cooling fin 119 may be added to contact the battery cell 110 located at the inner side, among the at least three battery cells 110.

Also, the cooling fin 119 may have various sizes. For example, the cooling fin 119a positioned to contact the battery cell 110 located at the inner side among the battery cells 110 may have a greater outer surface than the cooling fin 119b positioned to contact the battery cell 110 located at the outer side. That is, the cooling fin 119a positioned to contact the battery cell 110 located at the inner side may be set to have a larger heat dissipation amount than the cooling fin 119b positioned to contact the battery cell 110 located at the outer side.

Further, the cooling fin 119 may be configured to contact the battery cells 110 located at the inner side in the stacking direction, instead of contacting all of the battery cells 110. In this case, the number of the cooling fins 119 may be decreased, thereby not only reducing the manufacturing cost of the battery module 200F but also easily reducing the weight of the battery module 200F.

For example, as shown in FIG. 8, three cooling fins 119 may be added between the battery cells 110 located at the inner side in the cell assembly 100F. Also, among the three cooling fins 119, the cooling fin 119a located at the center may be formed to have a longer vertical length than the remaining cooling fins 119b.

Thus, according to this configuration of the present disclosure, if the cooling fin 119 is added to contact the battery cell 110 located at the inner side, the heat dissipation amount of the battery cell 110 located at the inner side (where the heat island is likely to occur) may be effectively increased. Accordingly, the heat balance of all battery cells 110 may be properly maintained and the performance and life characteristics of the battery module 200F may be effectively enhanced.

Figure 9:
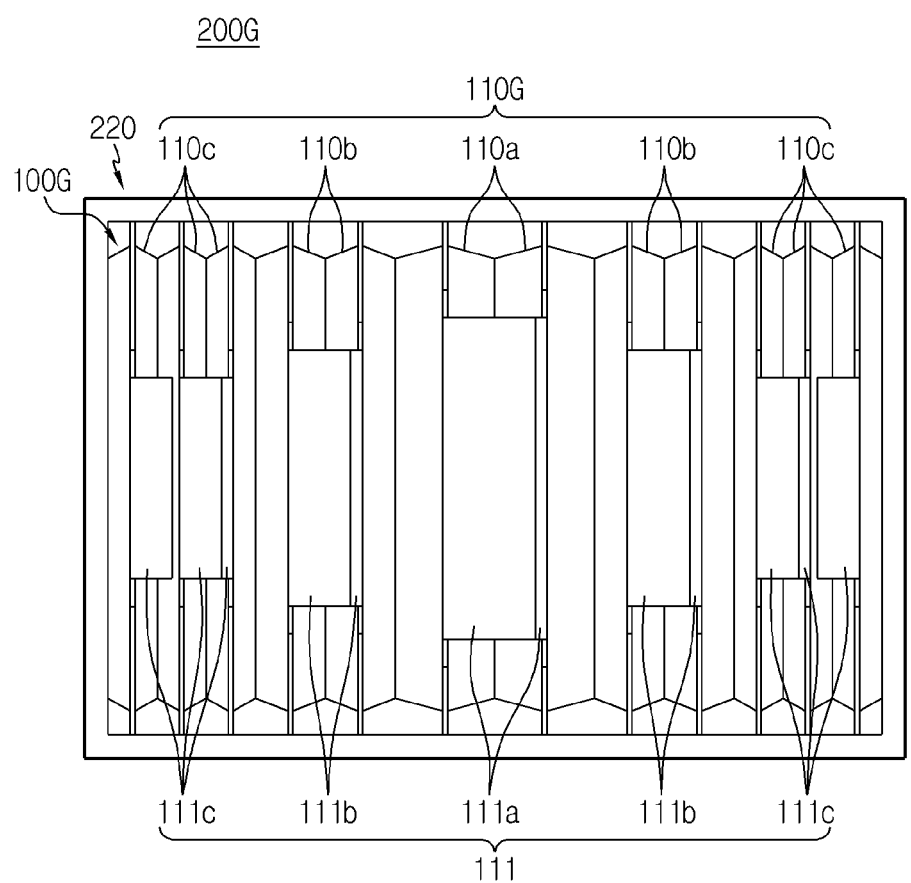
FIG. 9 is a front view schematically showing some components of a battery module according to still another embodiment of the present disclosure.

FIG. 9 is a front view schematically showing some components of a battery module according to still another embodiment of the present disclosure.

Referring to FIG. 9, in the cell assembly 100G of the battery module 200G according to still another embodiment, the electrode lead 111a of at least one battery cell 110G located at the inner side in the stacking direction of the battery cells 110G may have a greater outer area than the electrode lead 111c of the battery cell 110G located at the outer side.

In addition, the electrode lead 111a of the at least one battery cell 110G located at the inner side in the stacking direction of the battery cells 110G may be formed to have a greater vertical length than the electrode lead 111c of the battery cell 110G located at the outer side.

For example, as shown in FIG. 9, the electrode leads 111a of the battery cells 110a located at the innermost side among the twelve battery cells 110G may have the widest outer area. Further, the vertical lengths of the electrode leads 111 of the twelve battery cells 110c may be gradually increased from the battery cell 110c located at the outermost side to the battery cell 110a located at the innermost side in the stacking direction.

Specifically, as shown in FIG. 9, the electrode leads 111a of the two battery cells 110a located at the innermost side among the twelve battery cells 110G may be formed to have the longest vertical length, the electrode leads 111b of the four battery cells 110b located adjacent to the two battery cells 110a may be formed to have the second longest vertical length, and the electrode leads 111c of the six battery cells 110c located at the outer sides may be formed to have the shortest vertical length.

That is, since the heat dissipation amount of the battery cell 110G may be increased as the outer surface of the electrode lead 111 becomes larger, the heat accumulation is most likely to be generated in the battery cell 110G located at the inner side, so the battery cell 110a may be formed to have a wider outer surface so that the heat dissipation amount is increased.

Thus, according to this configuration of the present disclosure, since the electrode lead 111 of the battery cell 110G located at the inner side of the cell assembly 100G has a relatively wider outer surface, the heat dissipation amount of the battery cell 110G located at the inner side may be effectively increased. Also, a synergistic effect in increasing heat dissipation may be obtained by additionally increasing the thickness of the battery cell 110G located at the inner side.

Figure 10:
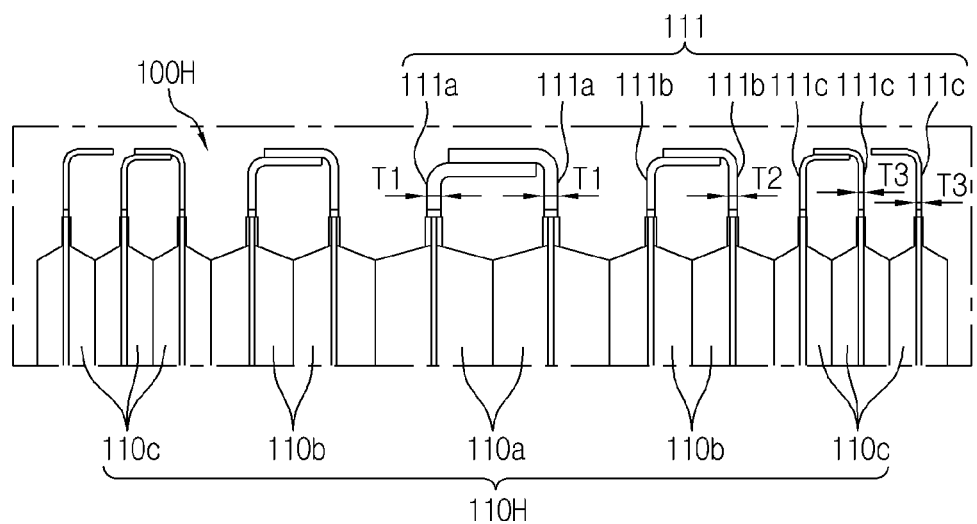
FIG. 10 is a partial plan view showing battery cells of a battery module according to still another embodiment of the present disclosure.

FIG. 10 is a partial plan view showing battery cells of a battery module according to still another embodiment of the present disclosure.

Referring to FIG. 10, in the cell assembly 100H of the battery module 200H according to still another embodiment of the present disclosure, the thickness T1 of the electrode lead 111a of at least one battery cell 110H located at the inner (central) side in the stacking direction of the battery cells 110H may be greater than that of the electrode lead 111c of the battery cell 110H located at the outer side.

For example, as shown FIG. 10, the thickness T1 of the electrode leads 111 of the twelve battery cells 110H in the stacking direction may be different from each other. That is, among the twelve battery cells 110H, the electrode leads 111a of two battery cells 110a located at the innermost side may have a thickness T1 of 0.8 mm, the electrode leads 111b of the remaining four battery cells 110H adjacent to the inner side may have a thickness T2 of 0.6 mm, the electrode leads 111c of the six battery cells 110H located at the outer side may have a thickness T3 of 0.4 mm.

Thus, according to this configuration of the present disclosure, since the electrode lead 111 of the battery cell 110a located at the inner side is formed thicker than the electrode lead 111 of the battery cell 110c located at the outer side, it is possible to increase the heat dissipation amount through the electrode lead 111 and reduce the electric resistance heat generated at the electrode lead 111, thereby effectively reducing the heat accumulation of the battery cell 110H located at the inner side.

In addition, a battery pack (not shown) according to the present disclosure may include at least one battery module 200 according to the present disclosure. Further, the battery pack according to the present disclosure may further include, in addition to the battery module 200, a pack case for accommodating the battery module 200, and various devices for controlling charge and discharge of the battery module 200, for example a battery management system (BMS), a current sensor, a fuse and the like.

In addition, the battery pack according to the present disclosure may be applied to a vehicle such as an electric vehicle and a hybrid electric vehicle. In other words, the vehicle according to the present disclosure may include the battery pack according to the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

200: battery module 230: end frame
100: cell assembly 110: battery cell
111: electrode lead 220: module housing
117: adhesive layer 119: cooling fin

INDUSTRIAL APPLICABILITY

The present disclosure relates to a battery module and a battery pack, which include a plurality of battery cells with different sizes. Also, the present disclosure is applicable to industries related to electronic devices or vehicles, which include the battery pack.

What is claimed is:

1. A battery module, comprising:
a cell assembly having at least three battery cells stacked along a stacking axis, such that an inner direction is defined from an outermost side of the cell assembly towards a center of the cell assembly along the stacking axis, and an outer direction is defined from the center of the cell assembly towards the outermost side of the cell assembly along the stacking axis, wherein a first one of the battery cells located at an interior position within the cell assembly along the stacking axis has a greater thickness along the stacking axis than a second one of the battery cells located in the outer direction from the first one of the battery cells, and wherein each of the at least three battery cells is received within a respective accommodation portion of a single, integrally-formed exterior case, such that the accommodation portion receiving the first one of the battery cells has a greater thickness along the stacking axis than the accommodation portion receiving the second one of the battery cells; and
a module housing having at least one sidewall and configured to accommodate the cell assembly including the single, integrally-formed exterior case in an inner space defined by the sidewall;
wherein the first one of the battery cells located at the interior position within the cell assembly has a greater height along a height direction transverse to the stacking axis than the second one of the battery cells located in the outer direction from the first one of the battery cells, and wherein the module housing has a rectangular parallelepiped shape including an upper wall and a lower wall that extend in a parallel relationship to the stacking axis and are spaced apart from one another in the height direction, such that a highest point of the second one of the battery cells is spaced further from at least one of the upper and lower walls in the height direction than a highest point of the first one of the battery cells.

2. The battery module according to claim 1, wherein the thickness of the battery cells along the stacking axis is gradually increased from one of the battery cells located along the outermost side of the cell assembly towards a different one of the battery cells located along the center of the cell assembly.

3. The battery module according to claim 1, wherein the first one of the battery cells located at the interior position within the cell assembly has a greater battery capacity than the second one of the battery cells located in the outer direction from the first one of the battery cells.

4. The battery module according to claim 1, wherein the sidewall of the module housing is configured to compress the battery cells in the inner direction so that no gap is generated between the battery cells.

5. The battery module according to claim 4, further including an elastic member positioned between an outermost side of the cell assembly and the at least one sidewall of the module housing.

6. The battery module according to claim 1, wherein an electrode lead of the first one of the battery cells located at the interior position within the cell assembly has a greater outer area than an electrode lead of the second one of the battery cells located in the outer direction from the first one of the battery cells.

7. The battery module according to claim 1, wherein an electrode lead of the first one of the battery cells located at the interior position within the cell assembly has a greater thickness along the stacking axis than an electrode lead of the second one of the battery cells located in the outer direction from the first one of the battery cells.

8. A battery pack, comprising at least one battery module according to claim 1.

9. A vehicle, comprising the battery pack according to claim 8.

* * * * *